(12) United States Patent
Perherin (10) Patent No.: US 11,022,236 B2
(45) Date of Patent: Jun. 1, 2021

(54) LONG TUBULAR PIPE COMPRISING A SEPARATING MEMBER AND METHODS FOR MOUNTING AND BENDING SUCH A PIPE

(71) Applicant: STELIA AEROSPACE, Rochefort (FR)

(72) Inventor: Daniel Perherin, Saint Nazaire (FR)

(73) Assignee: STELIA AEROSPACE, Rochefort (FR)

( * ) Notice: Subject to any disclaimer, the term of this patent is extended or adjusted under 35 U.S.C. 154(b) by 0 days.

(21) Appl. No.: 16/772,315

(22) PCT Filed: Dec. 3, 2018

(86) PCT No.: PCT/EP2018/083370
§ 371 (c)(1),
(2) Date: Jun. 12, 2020

(87) PCT Pub. No.: WO2019/115275
PCT Pub. Date: Jun. 20, 2019

(65) Prior Publication Data
US 2021/0010619 A1    Jan. 14, 2021

(30) Foreign Application Priority Data

Dec. 13, 2017   (FR) ...................................... 1762096

(51) Int. Cl.
| | | |
|---|---|---|
| *F16L 9/18* | (2006.01) | |
| *B21C 37/15* | (2006.01) | |
| *B21D 9/04* | (2006.01) | |
| *B29C 53/08* | (2006.01) | |
| *B29C 53/84* | (2006.01) | |
| *B29L 23/00* | (2006.01) | |
| *F16L 43/00* | (2006.01) | |

(52) U.S. Cl.
CPC .............. *F16L 9/18* (2013.01); *B21C 37/154* (2013.01); *B21D 9/04* (2013.01); *B29C 53/083* (2013.01);
(Continued)

(58) Field of Classification Search
CPC ........... F16L 9/18; F16L 39/005; F16L 43/00; B21D 9/04; Y10S 138/03; Y10S 138/08
(Continued)

(56) References Cited

U.S. PATENT DOCUMENTS 3,425,456 A * 2/1969 Schibig ................. F16L 59/103
138/162
3,489,183 A * 1/1970 Eberle ................... B29C 44/507
138/156
(Continued)

FOREIGN PATENT DOCUMENTS

| DE | 10 2011 105279 A1 | 12/2012 |
| WO | WO 2005/061142 A1 | 7/2005 |
| WO | WO 2015/186147 A1 | 12/2015 |

OTHER PUBLICATIONS

Search Report from French Intellectual Property Office on corresponding FR application (FR1762096) dated Jul. 13, 2018.
(Continued)

*Primary Examiner* — Patrick F Brinson
(74) *Attorney, Agent, or Firm* — Klein, O'Neill & Singh, LLP (57) ABSTRACT

The invention relates to a long tubular pipe comprising an outer tube, an inner fluid-transporting tube mounted in the outer tube, and a separating member designed to transmit bending efforts between said outer tube and said inner tube when said outer tube is bent, the separating member comprising means for the longitudinal passage of fluid between the inner tube and the outer tube, the separating member comprising a first edge and a second edge together defining an assembly slot, the first edge and the second edge respectively comprising a first connecting element and a second connecting element designed to cooperate mechanically on the outer periphery of the inner tube.

20 Claims, 5 Drawing Sheets

(52) U.S. Cl.
CPC ........... *B29C 53/84* (2013.01); *B29L 2023/22* (2013.01); *F16L 43/001* (2013.01); *F16L 43/008* (2013.01)

(58) Field of Classification Search
USPC ..... 138/113, 114, 148, 149, DIG. 3, DIG. 8, 138/128, 156, 162, 163
See application file for complete search history.

(56) References Cited

U.S. PATENT DOCUMENTS

| | | | | |
|---|---|---|---|---|
| 3,628,572 | A | * | 12/1971 | Shannon ............... F16L 59/024 138/161 |
| 3,753,635 | A | * | 8/1973 | Barnett ................. B29C 53/083 425/162 |
| 4,287,245 | A | * | 9/1981 | Kikuchi ................ F16L 59/024 138/141 |
| 4,576,846 | A | * | 3/1986 | Noel ....................... B29C 65/58 428/36.5 |
| 5,497,809 | A | | 3/1996 | Wolf |

OTHER PUBLICATIONS

International Search Report and Written Opinion on corresponding PCT application (PCT/EP2018/083370) from International Searching Authority (EPO) dated Feb. 11, 2019.
EP Communication under Rule 71(3) Epc with Text intended for grant on co-pending EP application (EP18808376.0) from the European Patent Office (EPO) dated Dec. 5, 2019.

\* cited by examiner

LONG TUBULAR PIPE COMPRISING A SEPARATING MEMBER AND METHODS FOR MOUNTING AND BENDING SUCH A PIPE

TECHNICAL FIELD

The present invention relates to the field of pipes for the transport of a fluid and, more particularly, the transport of fluid in an aircraft.

In a known manner, a "double skin" or "lined" pipe which comprises an outer tube wherein is mounted an inner fluid transporting tube is known in the prior art. The inner tube makes it possible, for example, to conduct a flow of fuel whereas the outer tube forms a protective envelope which makes it possible, on the one hand, to protect the inner tube in the event of impact and, on the other hand, to collect fuel in the outer tube in the event of leakage of the inner tube. This type of pipe also contributes to the confinement of fuel vapours.

The manufacture of such a tubular pipe is complex given that it is necessary that the inner tube is positioned coaxially with the outer tube. Furthermore, it is necessary to avoid that the tubes enter into contact during manufacture in order to create zones of weakness or obstruction to the passage of fuel. Important difficulties arise for the manufacture of a pipe of curved shape.

Conventionally, to obtain a curved pipe, a step of bending a longitudinal pipe is carried out wherein a separating member has been introduced beforehand between the inner surface of the outer tube and the outer surface of the inner tube. The separating member fulfils a function of interface between the inner tube and the outer tube during bending and makes it possible to avoid any contact between said tubes.

Figure 1:
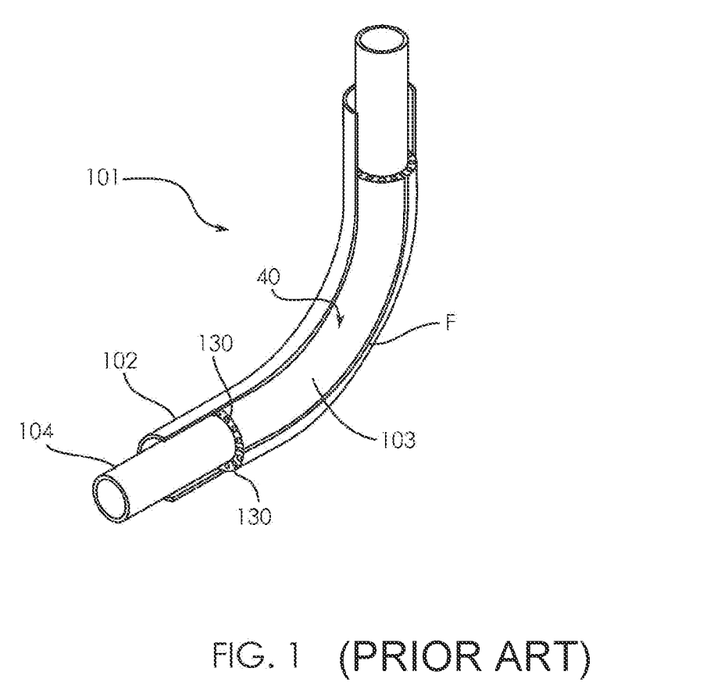
FIG. 1 is a schematic representation in perspective of a curved tubular pipe with a separating member according to the prior art.
Figure 2:
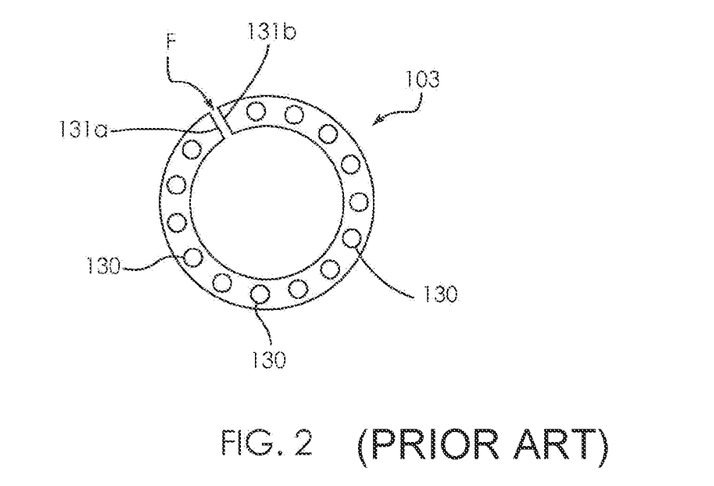
FIG. 2 is a schematic representation in transversal section of a separating member according to the prior art.

With reference to FIGS. 1 and 2, a tubular pipe 101 comprising an outer tube 102 wherein is mounted an inner tube 104, a longitudinal separating member 103 is positioned between said outer tube 102 and said inner tube 104 prior to the bending of the tubular pipe 101 is known from the U.S. Pat. No. 5,497,809. The separating member 103 comprises passage means 130 configured to enable a longitudinal circulation of fluid between the inner tube 104 and the outer tube 102. According to an embodiment of the U.S. Pat. No. 5,497,809, with reference to FIG. 2, the separating member 103 comprises a first longitudinal edge 131a and a second longitudinal edge 131b delimiting between them a longitudinal slot F in order to facilitate the mounting of the separating member 103 at the periphery of the inner tube 104. Due to the longitudinal slot F, the inner diameter of the separating member 103 is larger than the outer diameter of the inner tube 104, which can lead to a displacement of the separating member 103 during the mounting of the outer tube 102. Also, during bending, there exists a risk that the separating member 103 is not correctly positioned, which may lead to bending defects (folds, ovalisation, etc.). Moreover, the separating member 103 is liable to be displaced in the pipe 101 during the manipulation of said pipe 101, which can affect the positioning of the inner tube 104 in the outer tube 102 and create weak zones. The separating member 103 may be maintained in position on the inner tube 104 manually by an operator but this manipulation is not very practical. Also, to maintain the separating member 103 in position, an added tightening element is positioned at the periphery of the separating member 103. Such a tightening element increases the time for putting in place the separating member 103 and has an influence during bending.

In addition, such a separating member 103 has limitations for the bending of a pipe 101 made of double skin plastic material, that is to say, comprising an inner tube 104 made of plastic material and an outer tube 102 made of plastic material. Indeed, to enable optimal bending of a pipe made of double skin plastic material 101, it is known to heat the portion to bend beforehand. The use of a separating member 103 such as described by the U.S. Pat. No. 5,497,809 may disrupt the heating and thus prevent that the inner tube 104 is sufficiently heated. Indeed, the heating of the inner tube 104 at the level of the mounting slot F may not be sufficient. Also, during bending, the inner tube 104 may be deformed in an undesired manner and cause bending defects (folds, ovalisation, etc.).

The aim of the invention is thus to overcome these drawbacks by proposing a novel type of double skin pipe which can be bent with a reduced risk of defects, which is simple to assemble and practical to bend.

Although the invention was originally conceived for a pipe made of plastic material, it also applies to a metal pipe, in particular, made of aluminium.

SUMMARY

To this end, the invention relates to a longitudinal tubular pipe comprising a fluid transporting outer tube having an outer bent portion, a fluid transporting inner tube, mounted in the outer tube, having an inner bent portion substantially coaxial to the outer bent portion and a separating member, comprising a flexible longitudinal body, which is positioned between the inner bent portion and the outer bent portion and which extends coaxially to said bent portions, the separating member being configured to transmit bending forces between said outer tube and said inner tube when said outer tube is bent, the separating member comprising longitudinal fluid passage means between the inner tube and the outer tube, the separating member comprising a first edge and a second edge delimiting between them a mounting slot.

The pipe is remarkable in that the first edge and the second edge respectively comprise at least one first connecting element and at least one second connecting element configured to cooperate mechanically together at the outer periphery of the inner tube.

Thanks to the invention, the separating member may be locked in a practical manner at the outer periphery of the inner tube. It is advantageously not necessary to resort to an added tightening element as in the prior art. The use of such a separating member makes it possible to avoid any undesirable displacement liable to bring about bending defects. Finally, during heating, the edges are continuous, which makes it possible to achieve homogenous heating, guaranteeing optimal bending conditions. The separating member makes it possible to ensure homogenous thermal conduction between the outer tube and the inner tube without requiring particular heating means. The separating member may be, on the one hand, positioned in a practical manner thanks to the mounting slot in unlocked position. On the other hand, the separating member is advantageously continuous at the outer surface of the inner tube in locked position. Thus, the separating member has the advantages of a tubular peripheral separating member while having the advantages of a separating member having a slot to facilitate its mounting.

Preferably, the thickness of the separating member is constant at the periphery of the inner tube. The heating is thus homogenous at the periphery of the inner tube.

According to a preferred aspect, the inner tube and the outer tube each have a circular section.

Preferably, the inner tube and the outer tube are made of plastic material. The use of such a separating member is advantageous for tubes made of plastic material given that the risk of bending defect is higher. Since the heating is homogenous and regular at the periphery of the inner tube due to the thermal conduction of the separating member, bending is optimal.

Preferably, the separating member comprising an inner face and an outer face opposite to the inner face, the first connecting element and the second connecting element are formed on opposite faces.

According to a preferred aspect, the first connecting element comprises a first hollow part and a first projecting part whereas the second connecting element comprises a second hollow part and a second projecting part which are suited to cooperate respectively with the first projecting part and the first hollow part of the first connecting element. Such connecting elements make it possible to achieve peripheral retention by simple mechanical cooperation. Advantageously, the connecting elements have complementary shapes so that the separating member has a constant thickness at the periphery of the inner tube. Advantageously, each connecting element is in the form of a tongue.

Preferably, the projecting parts of each connecting element extend respectively to the free ends of the edges. Thus, they may be retained one with the other during the locking of the separating member without creating over-thickness.

Preferably, the first connecting element extends over the entire length of the first edge. Also preferably, the second connecting element extends over the entire length of the second edge which makes it possible to achieve a continuous closing of the mounting slot.

Alternatively, the first edge and the second edge respectively comprise a plurality of first connecting elements and a plurality of second connecting elements configured to cooperate mechanically together at the outer periphery of the inner tube. Preferably, the first connecting elements and the second connecting elements cooperate together by fitting of the male/female type. Preferably, the first connecting elements are distributed over the length of the first edge so as to form a plurality of elementary connection points. Further preferably, the separating member has a constant thickness.

Preferably, the edges are longitudinal, preferably, rectilinear. Such longitudinal edges make it possible to define a mounting slot that is longitudinal, which facilitates the putting in place of the separating member on a portion to bend of the inner tube.

Preferably, the fluid passage means are in the form of longitudinal orifices. Thus, the fluid is guided inside the separating member in the event of leakage, which does not affect the separation with an inner tube or an outer tube. According to a preferred aspect, the fluid passage means are distributed equally at the outer periphery of the inner tube.

The invention also relates to a method for mounting a longitudinal tubular pipe as described previously, the method comprising:
- a step of positioning a separating member on a portion to bend of the inner tube, the separating member being in the unlocked state,
- a step of cooperation of the first connecting element with the second connecting element so as to lock the separating member on the inner tube and
- a step of inserting the inner tube associated with the separating member into the outer tube.

Thanks to the mounting method according to the invention, the separating member is positioned in a rapid and precise manner by an operator on a portion to bend, the risk of defective positioning is thus limited.

The invention further relates to a method for bending a longitudinal tubular pipe as described previously, the longitudinal tubular pipe comprising a portion to bend wherein is positioned a separating member between the inner tube and the outer tube, the method comprising:
- a step of heating the portion to bend of the tubular pipe and
- a step of deforming the portion to bend in order to bend the longitudinal tubular pipe into a curve, the separating member transmitting bending forces between said outer tube and said inner tube when said outer tube is bent.

Once locked, the separating member has a continuous surface at the periphery of the inner tube. During heating of the tubular pipe, the outer tube is heated. By thermal conduction, the separating member is heated and heats, by thermal conduction, the inner tube. The absence of mounting slot, that is to say of discontinuity, makes it possible to achieve homogenous thermal conduction during heating.

BRIEF DESCRIPTION OF THE DRAWINGS

The invention will be better understood on reading the description that follows, given uniquely as an example, and by referring to the appended drawings in which.

It should be noted that the figures set out the invention in a detailed manner to implement the invention, said figures obviously being able to serve to better define the invention if need be.

DETAILED DESCRIPTION

Figure 3:
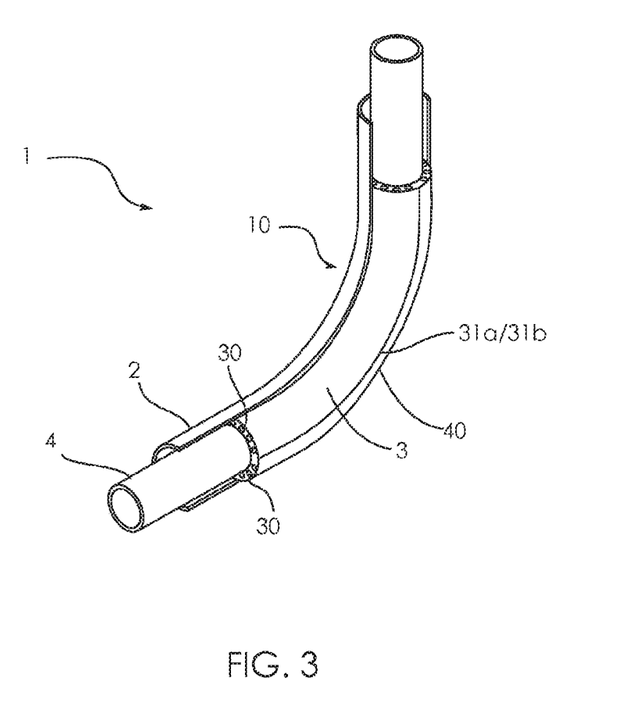
FIG. 3 is a schematic representation in perspective of a curved tubular pipe with a separating member according to an embodiment of the invention.

The invention will now be described for a longitudinal tubular pipe 1 comprising at least one bent portion 10, as illustrated in FIG. 3.

The tubular pipe 1 comprises a fluid transporting outer tube 2 having an outer bent portion 20, a fluid transporting inner tube 4, mounted in the outer tube 2, having an inner bent portion 40 substantially coaxial to the outer bent portion 20 and a separating member 3 which is positioned between the inner bent portion 40 and the outer bent portion 20 and extending coaxially to said bent portions 20, 40.

Preferably, the tubular pipe 1 is made of plastic material, that is to say, the outer tube 2 and the inner tube 4 are made of plastic material, which makes it possible to limit the weight of the tubular pipe 1. However, it goes without saying that the invention also applies to a tubular pipe 1 made of metal material.

Figure 4:
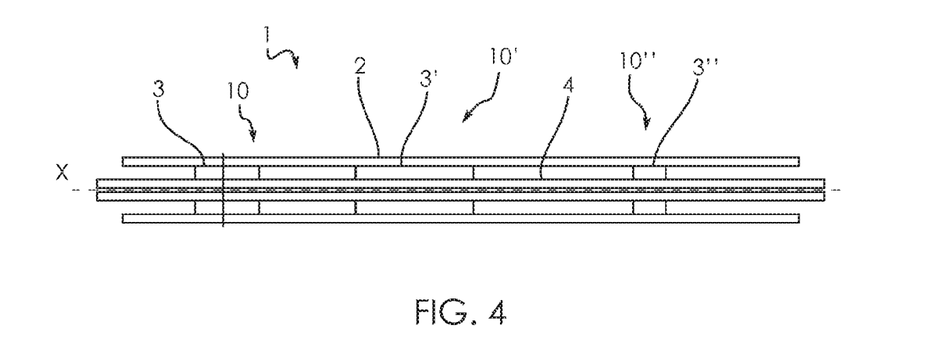
FIG. 4 is a representation in longitudinal section of a tubular pipe before bending.

In this example, with reference to FIG. 4 representing the tubular pipe 1 prior to its bending, the tubular pipe 1 extends longitudinally along an axis X and comprises an outer longitudinal tube 2 and an inner longitudinal tube 4 mounted in said outer longitudinal tube 2. In condition of use, the tubes 2, 4 extend coaxially and are separated from each other by a running clearance. Preferably, each tube 2, 4 has a circular section. As an example, with reference to FIG. 9, the outer tube 2 has a thickness of the order of 1 mm and an inner diameter D2 of the order of 19 mm whereas the inner tube 4 has a thickness of the order of 1 mm and an outer diameter D4 of the order of 13 mm so as to define a running clearance less than 6 mm. In practice, the outer tube 2 is shorter than the inner tube 4 in order that the inner tube 4 extends projecting from each end of the outer tube 2, as illustrated in FIG. 4.

According to the invention, with reference to FIG. 4, the separating member 3 is positioned between the outer tube 2 and the inner tube 4 and is configured to transmit bending forces between said outer tube 2 and said inner tube 4 when said outer tube 2 is bent. Thus, as illustrated in FIG. 3, after bending, the separating member 3 is positioned between the inner bent portion 40 and the outer bent portion 20 and extending coaxially to said bent portions 20, 40. In the example of FIG. 4, the tubular pipe 1 comprises three separating members 3, 3', 3" in order to form three portions to bend 10, 10', 10".

Figure 5:
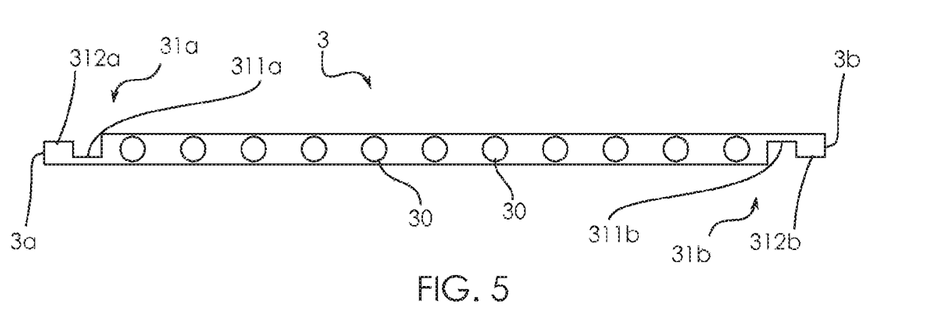
FIG. 5 is a schematic representation in transversal flat section of a separating member according to an embodiment of the invention.

As illustrated in FIG. 4, the separating member 3 comprises a longitudinal body of which the length is defined along the direction X. The separating member 3 has a body made of flexible material so as to be able to be wound at the outer periphery of the inner tube 4. Preferably, the separating member 3 extends flatly, as illustrated in FIG. 5, and is wound during its use. Advantageously, the separating member 3 is simple to form by cutting out of a roll of flexible material. In this example, the separating member 3 has a thickness comprised between 3.1 mm and 3.3 mm. The separating member 3 is made of elastomer, preferably, silicone, fluorosilicone, fluorinated elastomer, perfluorinated elastomer. The use of an elastomer is advantageous given that such a material benefits from an elongation at break at least two times greater than that of Teflon. In other words, the separating member 3 makes it possible to carry out important bendings in a practical manner. Moreover, it makes it possible to hug the shape of the inner tube 4 to be in permanent contact with the latter to heat it efficiently and to protect it during bending.

With reference to FIG. 5, the separating member 3 comprises fluid passage means 30 between the inner tube 4 and the outer tube 2 along the longitudinal direction. Thus, in the event of leakage of the fluid transported by the inner tube 4, the fluid is conducted in a confined manner in the longitudinal pipe 1 between the inner tube 4 and the outer tube 2. In this example, the fluid passage means 30 are in the form of through orifices but it goes without saying that other embodiments could be suitable, notably, inner serrations formed facing the inner tube 4, outer serrations formed facing the outer tube 2, cannula and others.

Figure 6:
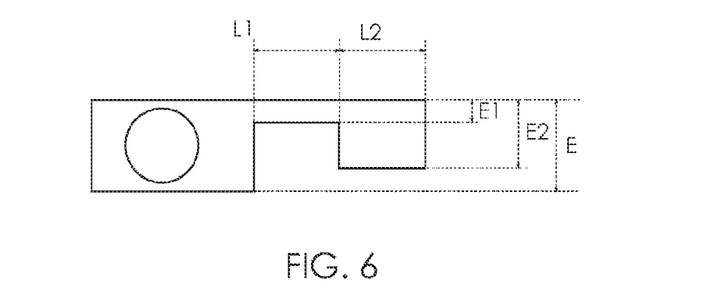
FIG. 6 is a close-up representation of an end of the separating member of FIG. 5.

As illustrated in FIGS. 5 and 6, the separating member 3 comprises a first longitudinal edge 3a and a second longitudinal edge 3b delimiting between them a longitudinal mounting slot make it possible to facilitate the winding of the separating member 3 around the inner tube 4. In an analogous manner to the prior art, such a longitudinal mounting slot makes it possible to put in place the separating member 3 in a precise manner on a portion to bend 40 of the inner tube 4.

In this example, the mounting slot is longitudinal but it goes without saying that it could be inclined, elliptical, etc, the important thing being that the mounting slot makes it possible to offer a radial clearance for the mounting of the separating member 3 on the inner tube 4. The separating member 3 thus does not necessarily need to be slid along the inner tube 4 during mounting.

Figure 7:
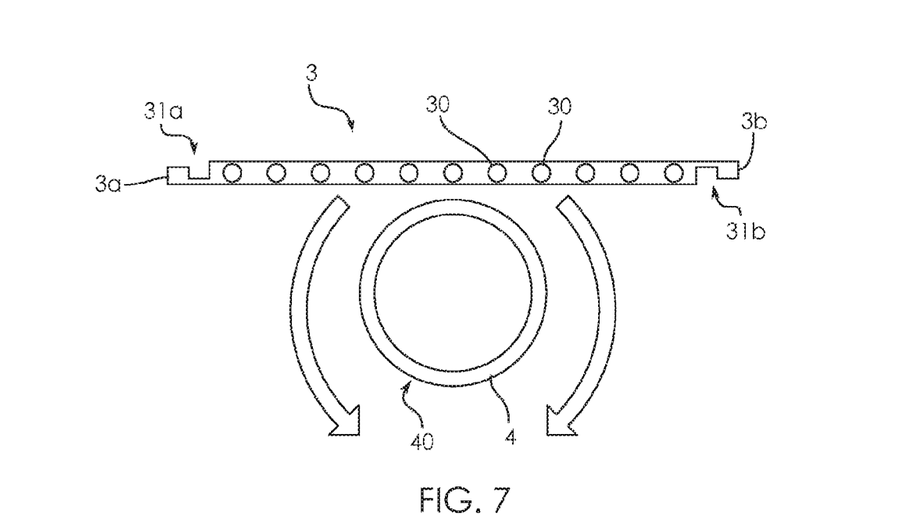
FIG. 7 is a schematic representation of the mounting of the separating member of FIG. 5 on an inner tube.

According to the invention, with reference to FIGS. 5 to 7, the first longitudinal edge 3a and the second longitudinal edge 3b respectively comprise a first connecting element 31a and a second connecting element 31b configured to cooperate mechanically together at the outer periphery of the inner tube 4. In other words, the separating member 3 evolves between an unlocked state, in which the connecting elements 31a, 31b do not cooperate and the edges 3a, 3b are moved apart to arrange a mounting slot, and a locked state, wherein the connecting elements 31a, 31b cooperate and the edges 3a, 3b are in contact so as to prohibit any displacement on the separating member 3 on the inner tube 4. Moreover, the separating member 3 extends continuously at the periphery of the inner tube 4, which makes it possible to improve thermal transfer, as will be described hereafter.

As illustrated in FIGS. 5 and 6, the connecting elements 31a, 31b are configured to cooperate mechanically by fitting, in particular, by complementarity of shapes. In locked position, the connecting elements 31a, 31b are aligned radially.

Advantageously, as illustrated in FIG. 5, the separating member 3 is symmetrical to be mounted on an inner tube 4 without taking account of the orientation of the separating member 3. Such a characteristic makes it possible, on the one hand, to accelerate the mounting of the separating member 3 and, on the other hand, to avoid an incorrect mounting which would impose unnecessary manipulations of the inner tube 4, thus increasing the risk of damage. With reference to FIG. 5, the first connecting element 31a is formed at the left end of the upper face whereas the second connecting element 31b is formed at the right end of the lower face.

Each connecting element 31a, 31b is, in this example, in the form of a tongue but it goes without saying that other shapes could be suitable to arrange a mounting slot. With reference to FIG. 5, the first connecting element 31a comprises a first hollow part 311a and a first projecting part 312a whereas the second connecting element 31b comprises a second hollow part 311b and a second projecting part 312b which are suited to cooperate respectively with the first projecting part 312a and the first hollow part 311a of the first connecting element 31a. The projecting part 312a, 312b of each connecting element 31a, 31b extends to a free end so as to enable retention. Each connecting element 31a, 31b extends over the entire length of the edge 3a, 3b so as to enable continuous closing of the mounting slot.

Figure 8:
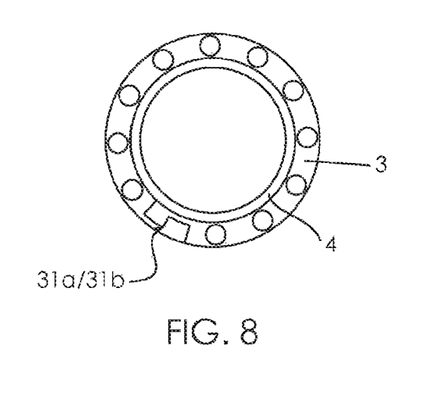
FIG. 8 is a schematic representation of the separating member mounted on the inner tube.

As an example, with reference to FIG. 6, each hollow part 311a, 311b has a thickness E1 comprised between 1 mm and 1.6 mm a width L1 comprised between 2 mm and 3 mm. In an analogous manner, each projecting part 312a, 312b has a thickness E2 comprised between 1.5 mm and 2.3 mm and a width L2 comprised between 2 mm and 3 mm. The thickness E2 is greater than the thickness E1. For a connecting element 31a, 31b, its hollow part 311a, 311b is adjacent to its projecting part 312a, 312b. Preferably, the widths L1, L2 are equal and the sum of the thicknesses E1 and E2 is equal to the total thickness E, here comprised between 3.1 mm and 3.3 mm, so that the separating member 3 has a continuous and constant thickness at the periphery of the inner tube 4 in locked position. In other words, in locked position, the section of the separating member 3 is in the form of a ring, as illustrated in FIG. 8.

Figure 11:
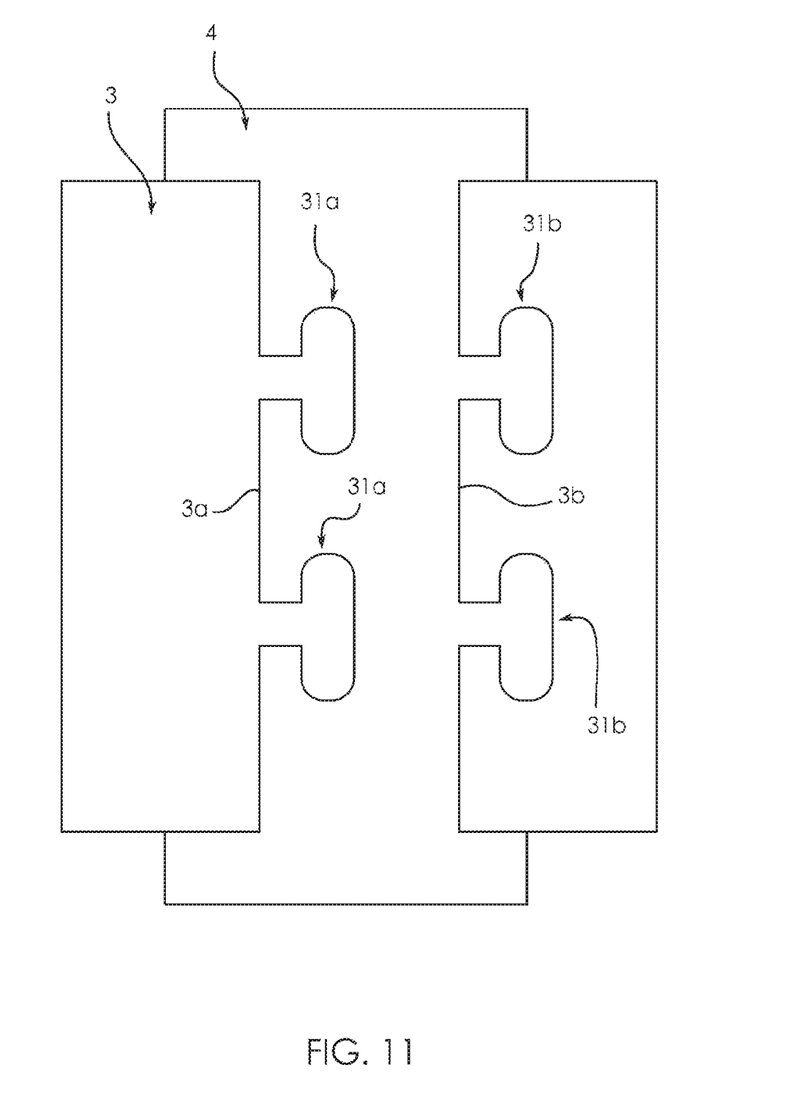

According to another embodiment, with reference to FIG. 11, the first edge 3a and the second edge 3b respectively comprise a plurality of first connecting elements 31a and a plurality of second connecting elements 31b configured to cooperate mechanically together at the outer periphery of the inner tube 104. The first connecting elements 31a and the second connecting elements 31b cooperate together by fitting of the male/female type. Further preferably, the separating member 3 has a constant thickness, the connecting elements 31a, 31b being produced by cutting of a body of constant thickness, which reduces the cost and facilitates the manufacture. As illustrated in FIG. 11, each first connecting element 31a is in the form of a tongue, here in dovetail shape, which cooperates with each second connecting element 31b being in the form of a notch of complementary shape to the tongue. In other words, each first connecting element 31a is connected to a second connecting element 31b in a manner analogous to a puzzle.

Preferably, the first connecting elements 31a are distributed over the length of the first edge 3a. The same applies to the second connecting elements 31b distributed over the length of the first edge 3a. Thus, closing is achieved by a plurality of elementary connection points. Such a closing is simple to be carried out by an operator during the mounting of a separating member 3 on the inner tube 4.

An exemplary embodiment of the invention will now be described with reference to FIGS. 7 to 10 for the bending of a tubular pipe 1 made of plastic material.

Figure 9:
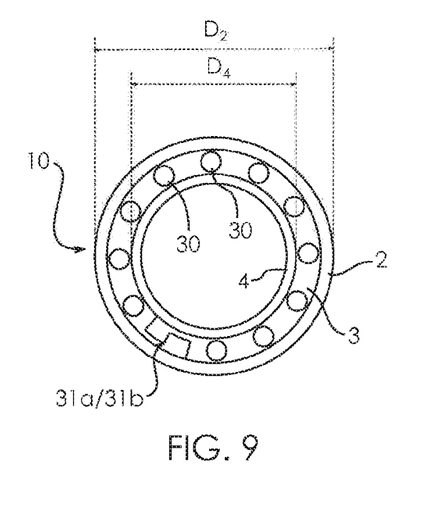
FIG. 9 is a schematic representation of the mounting of an outer tube externally to the separating member mounted on the inner tube.
Figure 10:
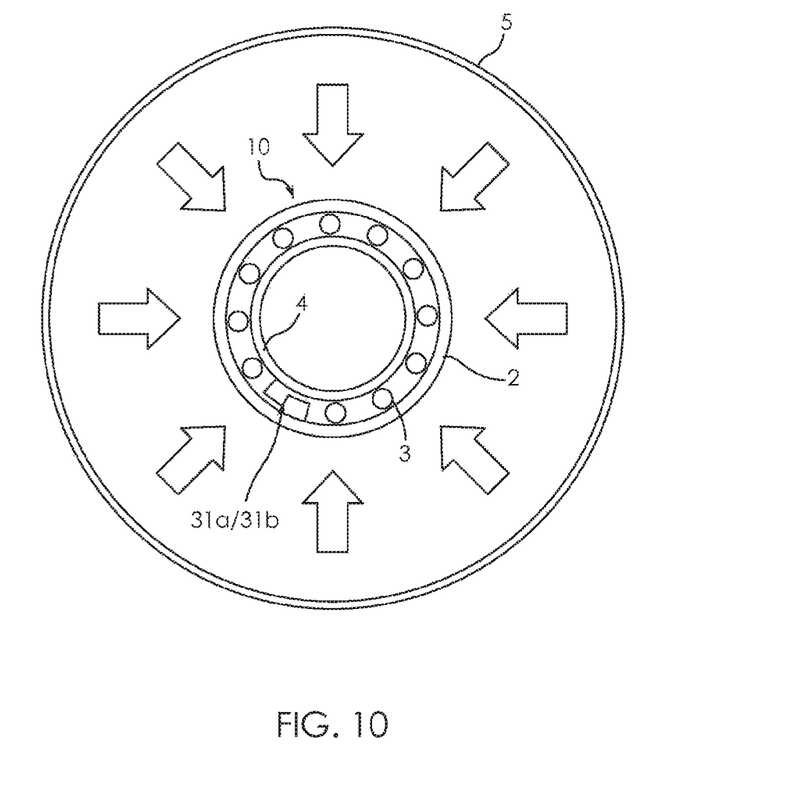
FIG. 10 is a schematic representation of a step of heating the tubular pipe and FIG. 11 is another embodiment of a separating member.

As illustrated in FIG. 7, each separating member 3 is in the form of a flat strip which is curved around the outer surface of the inner tube 4 in order to make the connecting elements 31a, 31b cooperate and to lock them together. The second hollow part 311b and the second projecting part 312b of the second connecting member 31b cooperate respectively with the first projecting part 312a and the first hollow part 311a of the first connecting element 31a to enable retention. The cooperation is radial between the connecting members 31a, 31b, as illustrated in FIGS. 8 to 10. The separating member 3 is in intimate contact with the outer surface of the inner tube 4, which guarantees optimal thermal conduction during heating and optimal transmission of forces during bending.

Advantageously, the positioning of the separating member 3 on the portion to bend 40 is precise and does not lead to forces on the separating member 3 or the inner tube 4, which limits the risk of damage. This is advantageous and practical by comparison with a mounting of a tubular separating member that would be slid along the inner tube 4.

Following the cooperation, as illustrated in FIG. 8, the separating member 3 has a continuous thickness at the periphery of the inner tube 4 in locked position. Thus, the inner tube 4 is protected uniformly with a view to bending it.

Preferably, several separating members 3 are positioned at different longitudinal positions of the inner tube 4 in order to correspond to the longitudinal portions to bend. Preferably, the longitudinal length of each separating member 3 is chosen as a function of the bending to carry out for a determined longitudinal portion. In this example, with reference to FIG. 4, the tubular pipe 1 comprises three separating members 3, 3', 3" in order to form three portions to bend 10, 10', 10".

With reference to FIG. 9, the inner tube 4 on which are mounted the separating members 3, 3', 3" is introduced into the inner cavity of the outer tube 2 so that each separating member 3, 3', 3" extends between the inner tube 4 and the outer tube 2. To facilitate mounting, the inner tube 4 associated with the separating members 3, 3', 3" may be cooled to a temperature below −10° C. in order to facilitate its mounting with the outer tube 2 which remains at ambient temperature. Thus, as illustrated in FIG. 9, the inner tube 4, the outer tube 2 and the separating member 3 are coaxial.

Prior to the step of mechanical deformation of the tubular pipe 1, each portion to bend 10, 10', 10" is heated so as to facilitate its deformation. Preferably, heating means 5, notably by infrared, heat in a peripheral and external manner the portion to bend 10 as illustrated in FIG. 10. In practice, the heating means 5 emit infrared radiation which does not make it possible to heat imposing thicknesses of pipe to high temperatures. Also, it is important to benefit from good thermal conduction to make it possible to heat the inner tube 4. Optimal thermal conduction is furthermore desired for any type of heating.

Thus, the temperature of the outer tube 2 increases progressively, which heats, by thermal conduction, the separating member 3. Since the separating member 3 has a continuous thickness at the periphery of the inner tube 4, the thermal conduction by the separating member 3 is homogenous, which makes it possible to heat in a homogenous manner the inner tube 4. In other words, thanks to the invention, the inner tube 4 is heated in an optimal manner using conventional heating means 5.

The portion to bend 10 of the tubular pipe 1 may next be bent by a conventional bending machine (not represented) in order to deform mechanically the inner tube and the outer tube 2 of the tubular pipe 1. In a known manner, a mandrel is introduced into the inner cavity of the inner tube 4 during bending. Advantageously, the separating member 3 makes it possible to transmit bending forces between the outer tube 2 and the inner tube 4, which limits the appearance of bending defects (folds, ovalisation, etc.). Thanks to the invention, the separating member 3 is not displaced during the step of deformation, which ensures a controlled and precise deformation, limiting the risk of defects.

The invention claimed is:
1. A longitudinal tubular pipe comprising:
  a fluid transporting outer tube having an outer bent portion;
  a fluid transporting inner tube, mounted in the outer tube, having an inner bent portion substantially coaxial to the outer bent portion; and
  a separating member, comprising a flexible longitudinal body, which is positioned between the inner bent portion and the outer bent portion and which extends coaxially to said bent portions, the separating member being configured to transmit bending forces between said outer tube and said inner tube when said outer tube is bent, the separating member comprising longitudinal fluid passage means between the inner tube and the outer tube, the separating member comprising a first edge and a second edge delimiting between them a mounting slot;

wherein the first edge and the second edge respectively comprise at least one first connecting element and at least one second connecting element that mechanically cooperate at an outer periphery of the inner tube.

2. The longitudinal tubular pipe according to claim 1, wherein, the separating member comprising an inner face and an outer face opposite to the inner face, the first connecting element and the second connecting element are formed on opposite faces.

3. The longitudinal tubular pipe according to claim 2, wherein the first connecting element comprises a first hollow part and a first projecting part whereas the second connecting element comprises a second hollow part and a second projecting part which are suited to cooperate respectively with the first projecting part and the first hollow part of the first connecting element.

4. The longitudinal tubular pipe according to claim 3, wherein the projecting parts of each connecting element extend respectively to the free ends of the edges.

5. The longitudinal tubular pipe according to claim 4, wherein the edges are longitudinal, rectilinear.

6. The longitudinal tubular pipe according to claim 5, wherein each connecting element is in the form of a tongue.

7. The longitudinal tubular pipe according to claim 6, wherein the fluid passage means are in the form of longitudinal orifices.

8. The longitudinal tubular pipe according to claim 7, wherein the fluid passage means are distributed equally at the outer periphery of the inner tube.

9. A method for mounting the longitudinal tubular pipe according to claim 1, comprising:
a step of positioning a separating member on a portion to bend of the inner tube, the separating member being in the unlocked state;
a step of cooperation of the first connecting element with the second connecting element so as to lock the separating member on the inner tube; and
a step of inserting the inner tube associated with the separating member into the outer tube.

10. The method for bending the longitudinal tubular pipe according to claim 1, the longitudinal tubular pipe comprising a portion to bend wherein is positioned a separating member between the inner tube and the outer tube, the method comprising:
a step of heating the portion to bend of the tubular pipe; and
a step of deforming the portion to bend in order to bend the longitudinal tubular pipe into a curve, the separating member transmitting bending forces between said outer tube and said inner tube when said outer tube is bent.

11. The longitudinal tubular pipe according to claim 1, wherein a constant thickness is formed where the first edge and the second edge mechanically cooperate.

12. A longitudinal tubular pipe comprising:
a combination comprising a separating member surrounding an exterior of an inner tube having a bore and wherein the combination is located inside an outer tube;
the outer tube having a bent portion;
the inner tube having bent portion substantially coaxial to the bent portion of the outer tube;
the separating member being a strip having a longitudinal body flexibly conforming around the exterior of the inner tube, the longitudinal body comprising a first edge, a second edge, an upper face, a lower face, and a thickness defined between the upper face and the lower face, and wherein the lower face is in contact with an exterior of the inner tube and the upper face is in contact with an interior of the outer tube;
a plurality parallel and spaced apart fluid passages formed between the upper face and the lower face of the of the longitudinal body of the separating member; and
wherein the first edge overlaps with the second edge to define an overlapped section substantially along a length between a first end and a second of the flexible longitudinal body of the separating member.

13. The longitudinal tubular pipe of claim 12, wherein the first edge comprises a first projection and a first hollow part and the second edge comprises a second projection and a second hollow part mechanically engaged at the exterior of the inner tube.

14. The longitudinal tubular pipe of claim 12, wherein the lower face of the separating member is in contact with the exterior of the inner tube and the upper face is in contact with the interior of the outer tube before and after the bent portion of the inner tube and the bent portion of the outer tube are coaxially arranged.

15. The longitudinal tubular pipe of claim 12, wherein each of the spaced apart fluid passages has a circular cross-section.

16. The longitudinal tubular pipe of claim 12, wherein the separating member is made from an elastomer material.

17. The longitudinal tubular pipe of claim 16, wherein elastomer material is a silicone material, a fluorosilicone material, a fluorinated elastomer material, or a perfluorinated elastomer material.

18. The longitudinal tubular pipe of claim 16, wherein the inner tube is made from a plastic material.

19. The longitudinal tubular pipe of claim 18, wherein the outer tube is made from a plastic material.

20. The longitudinal tubular pipe of claim 12, wherein the overlapped section has a generally constant thickness with the thickness of the longitudinal body.

* * * * *